United States Patent [19]

Chavez

[11] Patent Number: 4,955,440
[45] Date of Patent: Sep. 11, 1990

[54] ROTARY DRILL BITS WITH PLURAL SEALING SYSTEMS

[75] Inventor: Javier Chavez, Edo, Venezuela
[73] Assignee: Intevep, S.A., Caracas, Venezuela
[21] Appl. No.: 382,559
[22] Filed: Jul. 19, 1989
[51] Int. Cl.⁵ .................... F16C 33/76; F21B 10/22
[52] U.S. Cl. ..................................... 175/371; 384/94
[58] Field of Search .............. 175/371, 372, 359, 370; 384/92, 94, 96

[56] References Cited

U.S. PATENT DOCUMENTS

| | | | |
|---|---|---|---|
| 1,884,965 | 10/1932 | Baggett et al. | 384/94 |
| 4,249,781 | 2/1981 | Olschewski et al. | 384/94 |
| 4,263,976 | 4/1981 | Lachonius | 175/372 X |
| 4,552,233 | 11/1985 | Klima | 175/371 |
| 4,577,705 | 3/1986 | Cross | 175/371 X |
| 4,722,404 | 2/1988 | Evans | 175/371 |

FOREIGN PATENT DOCUMENTS 794154 2/1981 U.S.S.R. ........................ 175/371

Primary Examiner—Jerome W. Massie
Assistant Examiner—David J. Bagnell
Attorney, Agent, or Firm—Dressler, Goldsmith, Shore, Sutker & Milnamow, Ltd.

[57] ABSTRACT

An earth boring rotary drill bit suitable for use in drilling oil wells and the like includes a rotating cone mounted on a journal that is protected by a primary seal and a secondary seal. The seals provide independent sealing action while coacting to stabilize the rotary motion of the cone. The primary seal defines a moving sealing surface in contact with the journal, and the secondary seal defines a moving sealing surface in contact with the rotating cone. The journal can have a frusto-conical or cylindrical configuration.

9 Claims, 2 Drawing Sheets

ROTARY DRILL BITS WITH PLURAL SEALING SYSTEMS

TECHNICAL FIELD

This invention relates to earth boring drill bits of the type employed in drilling for petroleum and, more particularly, to rotary drill bits having sealing systems and bearing configurations that enhance the useful life of the bits.

BACKGROUND OF THE INVENTION

Earth boring bits of the type used in drilling oil or gas wells are subjected to severe and destructive conditions of stress, shock, abrasion, corrosion and temperature. It has been reported that drill bits can be subjected to 40,000–50,000 pounds of drilling pressure. A typical such drill bit comprises three roller cutters or cones with external cutting teeth mounted for rotation on a stationary journal or bearing shaft. In operation, the bit is threaded onto a drill string or drill pipe and drilling fluid or mud is injected into the well bore through the pipe to flush out the rock chips and other detritus as they are formed. Normally, a drill bit of this type will be operated until the cutting teeth or the bearings supporting the cones on the shaft become excessively worn. Thus, the preservation of the bearing surfaces between the cones and their bearing shafts is critical to the operating lifetime of an earth boring bit.

As a general rule, the earth boring drill bit is provided with means for lubricating the bearings thereof. However, great care must be taken to prevent the loss of the lubricant or the entrance of abrasive rock fragments or corrosive material into the bearings. To this end, there have heretofore been provided numerous sealing systems designed to withstand the destructive operating conditions and the complex movements of the cutter cones which include wobbling and axial movement as well as rotation about the axis of the bearing shaft.

The criticality of the sealing systems and the steps heretofore taken in an effort to provide even more efficient and durable systems may best be appreciated by referring to U.S. Pat. No. 4,516,641 to Burr, which traces the evolution of the cylindrical journal or shaft provided with a single seal comprising pairs of opposed resilient rings and rigid rings positioned in a seal groove between the shaft and cutter cone. That reference also refers to and describes the teachings of a number of earlier earth boring bits U.S. patents, including U.S. Pat. No. 930,759 to Hughes; U.S. Pat. No. 3,075,781 to Atkinson et al U.S. Pat. No. 3,397,928 to Galle; U.S. Pat. No. 3,180,648 to Kupfert; U.S. Pat. No. 3,216,513 to Robbins; U.S. Pat. No. 3,452,995 to Engelking; and U.S. Pat. No. 3,761,145 to Schumacher, Jr.

In addition to the above listed patents, applicant is aware of U.S. Pat. No. 3,656,764 to Robinson, showing a generally cylindrical bearing shaft with single seal in a groove comprising a pair of compressible rings and a metal ring; U.S. Pat. No. 4,394,020 to Oelke, showing a generally cylindrical bearing shaft with single seal in a groove comprising a pair of compressible rings and a metal ring; and U.S. Pat. No. 4,632,401 to Kar et al., which teaches a generally cylindrical bearing shaft and a single belleville seal comprising metal encased in an elastomeric material.

It is desirable that the earth boring drill bits be operated for the longest possible time between bit changes. However, the cited prior patents illustrate that the search for a more durable bit and more efficient sealing system therefor continues unabated.

SUMMARY OF THE INVENTION

The present invention provides an improved drill bit having relatively longer operational life than prior rotary drill bits. The improved drill bit comprises a multiple or dual circumferential seal system which is able to accommodate effectively the complex radial, axial and angular displacements of the drill bit cutting cone during use.

More specifically, the first or primary circumferential seal is provided within a rotary drill bit cone by a compressible, resilient ring received in an annular, multi-faceted trough defined by an interior surface of the cone and engaging an arcuate peripheral surface of a journal on which the cone is mounted. This peripheral surface is defined by juncture of the journal and a journal pedestal that has an outside diameter larger than that of the journal. The multi-faceted trough provides plural circumferential sealing faces for the resilient ring while the arcuate peripheral surface provides an additional circumferential sealing surface. Such a sealing arrangement accommodates axial as well as circumferential movement of the ring as the cone is rotated about the journal.

The second or secondary circumferential seal is provided at the proximal end of the rotary drill bit cone by a belleville-type annular sealing member mounted on the journal pedestal and received within a peripheral groove defined by the cone at the open, journal-receiving end thereof.

Both the primary and the secondary seals are dynamic seals that provide independent sealing action while together these seals stabilize the rotation of the cone. In this manner, seal breakdown and degradation is minimized while the useful operational life of the rotary drill bit is extended.

The bearing shaft can be substantially conical or cylindrical. The internal bearing surface of the cutting cone is complementary to the bearing shaft. However, the conical configuration is preferred inasmuch as such bearing surfaces provide greater bearing contact area which better distributes the work load stresses and reduces the wear rate of the bearing surfaces.

Numerous other advantages and features of the present invention will become apparent from the following detailed description of the invention, from the claims and from the accompanying drawings.

DETAILED DESCRIPTION OF PREFERRED EMBODIMENTS

Figure 1:
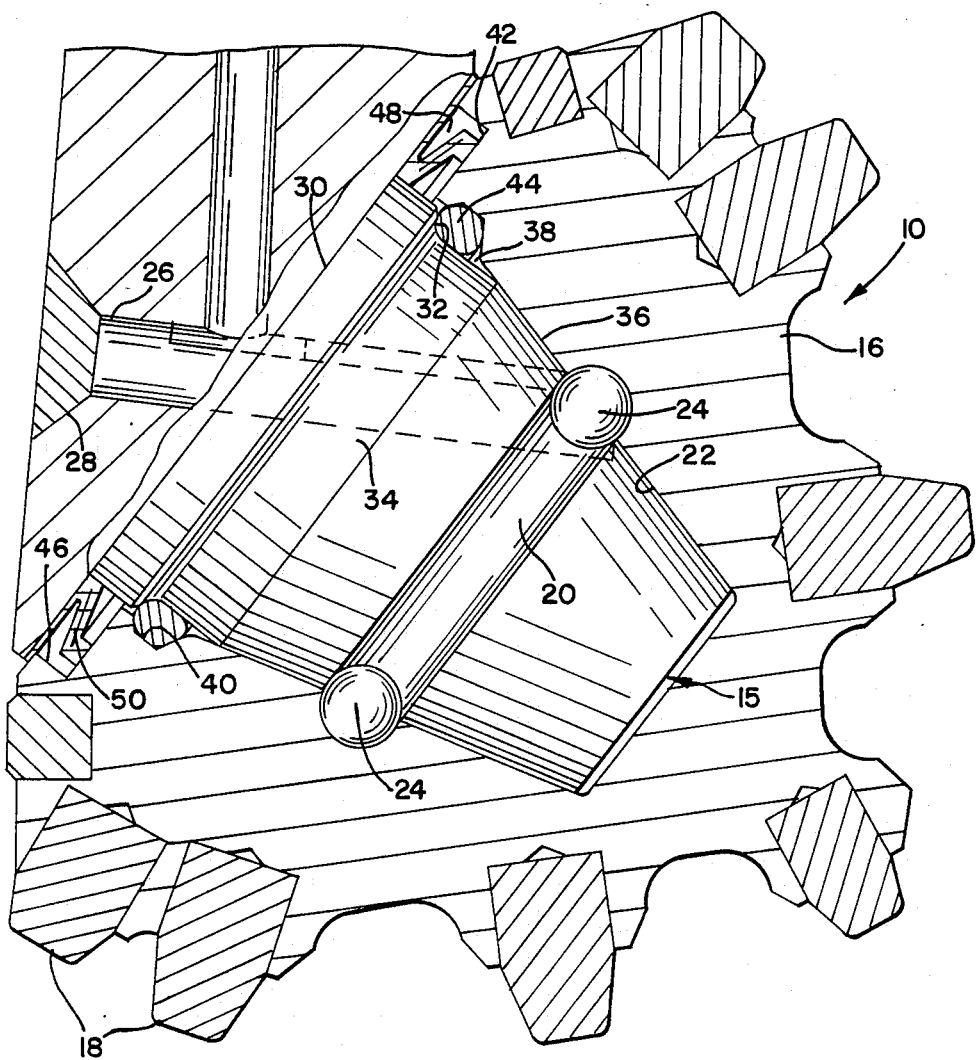
FIG. 1 is a partial sectional view of a portion of a rotary drill bit embodying the principles of the present invention.

Referring to the drawings, in FIG. 1 reference numeral 10 indicates generally a rotary earth boring bit embodying the principles of this invention. Bit 10 comprises a substantially frusto-conical journal or bearing shaft 15 upon which is rotatably supported a roller cutter or cone 16 carrying cutting elements or teeth 18. A thrust ball raceway 20 is defined by the interior or inner surface 22 of the cone 16 and the shaft 15 for retaining therein thrust balls 24, or the like. Thrust balls 24 are insertable through a channel 26 which is thereafter sealed with a ball plug 28 in a conventional manner. The bit may also include suitable means for injecting lubricant between the bearing surfaces.

Bearing shaft or journal 15 is mounted on pedestal 30 which has an outside diameter larger than that of shaft or journal 15. Cylindrical base 34 of journal 15 and the pedestal 30 together define a smooth, arcuate surface 32. A major frusto-conical bearing surface is designated by 36 and is interrupted only by the raceway 20. Shaft bearing surface 36 and the inner cone surface 22 complementary therewith thus provide an enhanced bearing contact area for a given shaft length, thereby rendering the bearing assembly inherently self-centering and resistant to destructive wobbling movements.

Opposed to the arcuate surface 32 on journal 15, the cone is formed with an annular recess or trough 38 having plural intersecting beveled faces 40. The arcuate surface 32 preferably has an arc of curvature of at least about $\pi/2$ radians, or more. This arcuate surface cooperates with the multi-faceted trough 38 to define a first or primary sealing groove within which resilient and compressible O-ring 44 is operationally positioned. Ring 44 together with the defined groove provide a primary seal for the bearing surfaces which seal readily accommodates axial as well as wobbling movements of the cone 16 relative to the bearing shaft 15 while avoiding undesirable stress concentrations at the seal. At the same time, engagement of the sealing ring 44, such as an O-ring, by one or more of the beveled, intersecting faces 40 insures a relatively stationary and stress-free seating of the sealing ring in the groove.

In the embodiment shown in FIG. 1, multi-faceted trough 38 is defined by three substantially coextensive but intersecting faces that circumscribe bearing shaft or journal 15. Ring 44 is received within the trough 38 preferably so that there is no relative movement between the ring 44 and cone 16 while ring 44 provides a moving sealing surface in contact with bearing shaft or journal 15 that moves relative to the surface of journal 15 as the cone 16 is rotated.

In the vicinity of the bearing shaft pedestal 30, the proximal end portion of the cone 16 is formed with an annular recess 46 of substantially rectangular cross-section and a planar sealing surface 42 substantially normal to the axis of journal 15. The recess 46 cooperates with the cylindrical outer surface of pedestal 30 to define a sealing groove 48 for the secondary seal. A belleville-type annular sealing member 50 with an elastomeric coating is mounted in groove 48 about the pedestal 30, preferably fixedly mounted by an interference fit around the outer periphery of pedestal 30. In this manner the belleville sealing member 50 provides a moving sealing surface in contact with the cone in annular recess or groove 46 thereof. An illustrative belleville sealing member is described in U.S. Pat. No. 4,632,401 and includes a belleville spring encapsulated within an elastomeric material. An inner metallic ring member secured to the elastomeric material has a central aperture that fits over pedestal 30 and can be secured thereto by an interference fit, by tack welding, or similar expedients. The sealing member 50 thus provides a secondary seal which prevents access of corrosive fluids and abrasive materials to the bearing surfaces and, under normal operating conditions, will wear out first. The secondary seal thus also functions in part as a sacrificial seal that prolongs the life of the primary seal 44. Additionally, by providing a force vector substantially along the axis of the cone journal or bearing shaft 15, the secondary seal assists in minimizing a wobbling motion by the cone itself.

Figure 2:
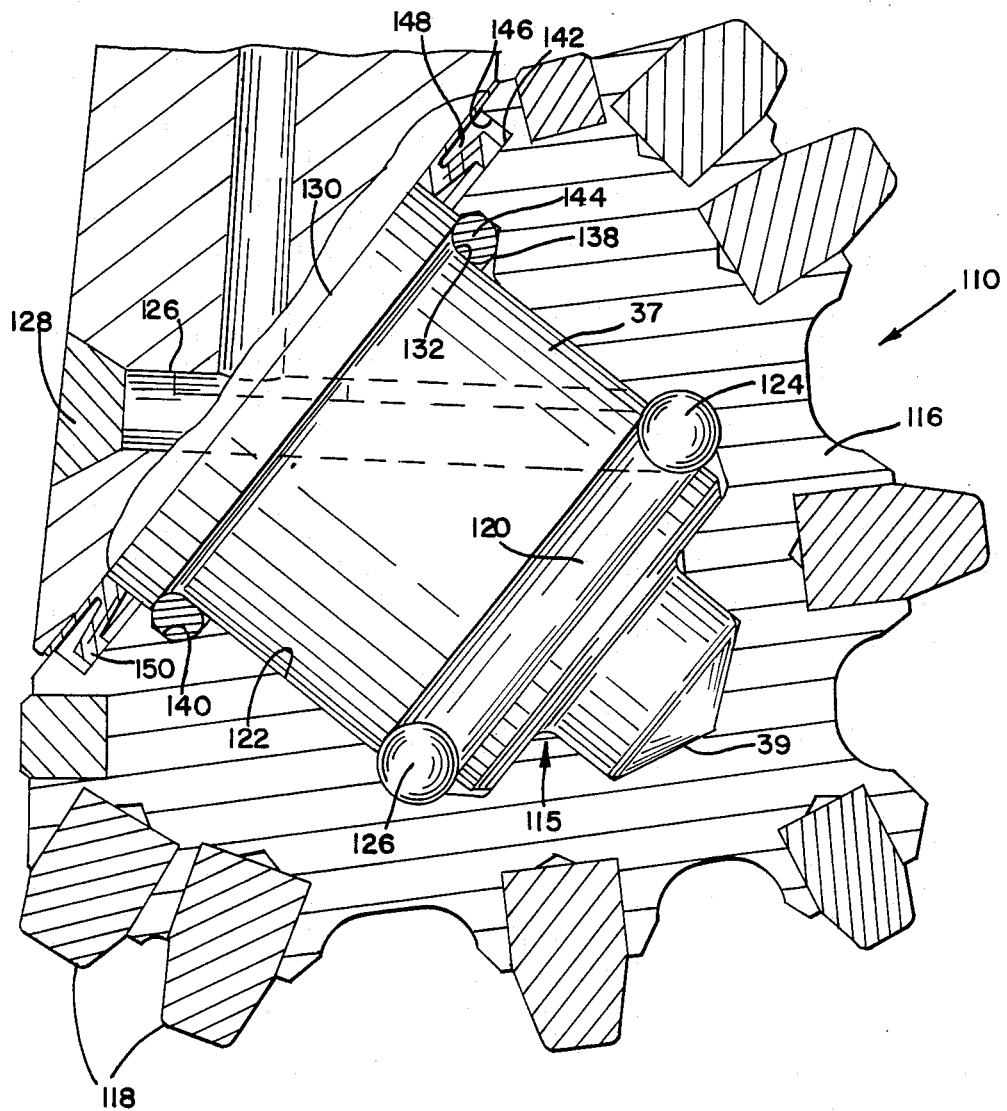
FIG. 2 is a similar view of a second embodiment illustrating the present invention.

FIG. 2 illustrates a second embodiment of the invention wherein like parts are identified by numerals having like last two digits. The earth boring rotary bit 110 thus comprises a substantially cylindrical bearing shaft 115 rotatably supporting a cone 116 having teeth 118. The bearing shaft 115 terminates in pedestal 130, and at the juncture thereof defines a smooth, arcuate surface 132. Major cylindrical bearing surface 37 is provided with a ball raceway 120 at the forwardmost end thereof. A thrust projection 39 extends centrally from the front of the bearing shaft 115 to aid in centering of the cone 116 on the shaft 37. With the exception of the configuration of the shaft bearing surface 37, thrust projection 39, and the positioning of the raceway 120 on bearing surface 37, the construction and operation of the bit 110 is substantially the same as that of bit 10, shown by FIG. 1.

Both sealing ring 44 and belleville sealing member 50 may be made of any suitable elastomeric material or an elastic composite as is well known in the art. It is important to note, however, that the present invention provides two separate seals elements that coact to prolong the useful operational life of the bit.

The foregoing detailed description of the invention and illustrative embodiments thereof are intended as illustrative. Numerous variations and modifications thereof may be effected without departing from the spirit and scope of this invention.

I claim:
1. An earth boring rotary bit comprising:
    a bearing shaft defining a bearing surface having a substantially frusto-conical configuration and terminating at its proximal end in a pedestal having an outside diameter larger than the diameter of the bearing shaft;
    a cutter cone secured for rotation about the bearing shaft and having a bearing surface complementary to that of the bearing shaft;
    a plurality of axially spaced sealing assemblies between the bearing shaft and the cone, one of said sealing assemblies defining a primary seal about the bearing shaft for said complementary bearing surfaces and another of said sealing assemblies being mounted on said pedestal and defining a secondary seal that prevents fluid access to the bearing surfaces and provides a force vector substantially along the longitudinal axis of the bearing shaft, each of said sealing assemblies providing sealing action while coacting to stabilize rotation of the cone about the bearing shaft.
2. A rotary bit which comprises a bearing shaft that terminates at its proximal end in a pedestal having an outside diameter larger than the diameter of the bearing shaft and together with the bearing shaft defines an arcuate peripheral surface having an arc of at least about $\pi/2$ radians;
    a cutter cone mounted for rotation on said bearing shaft and having an open proximal end surrounding said pedestal; an interior surface of the cutter cone defining an annular, multi-faceted trough opposite to said arcuate peripheral surface and the proximal end of the cone defining a peripheral groove;
    a compressible, resilient ring received in said multi-faceted trough and in sealing engagement with the trough as well as with said arcuate peripheral surface; and a belleville sealing member mounted on said pedestal and in sealing engagement with said peripheral groove.

3. The rotary bit in accordance with claim 2 wherein said annular, multi-faceted trough in the cutter cone is provided with three substantially coextensive but intersecting faces that circumscribe said bearing shaft and wherein said resilient ring is in contact with each of the intersecting faces.

4. The rotary bit in accordance with claim 2 wherein said bearing shaft has a substantially frustoconical configuration.

5. The rotary bit in accordance with claim 2 wherein said bearing shaft has a substantially cylindrical configuration.

6. The rotary bit in accordance with claim 2 wherein said resilient ring is wedged in said multi-faceted trough so that there is no relative movement between the resilient ring and the cone.

7. The rotary bit in accordance with claim 2 wherein said resilient ring is received in said multi-faceted trough and provides a moving sealing surface in contact with the bearing shaft.

8. The rotary bit in accordance with claim 2 wherein said belleville sealing member is fixedly mounted about said pedestal and provides a moving sealing surface in contact with the cone.

9. The rotary bit in accordance with claim 2 wherein said resilient ring is mounted in the cone and provides a moving sealing surface in contact with the bearing shaft and said belleville sealing member is mounted about said bearing shaft and provides a moving sealing surface with said cone.

* * * * *